US012258806B2

(12) United States Patent
Dunstan

(10) Patent No.: US 12,258,806 B2
(45) Date of Patent: Mar. 25, 2025

(54) DIAGONALLY TRANSLATING DOOR

(71) Applicant: Lokaway Pty Ltd, Pakenham (AU)

(72) Inventor: Brett Dunstan, Pakenham (AU)

(73) Assignee: LOKAWAY PTY LTD, Pakenham (AU)

( * ) Notice: Subject to any disclaimer, the term of this patent is extended or adjusted under 35 U.S.C. 154(b) by 175 days.

(21) Appl. No.: 18/010,034

(22) PCT Filed: Jun. 2, 2021

(86) PCT No.: PCT/AU2021/050543
§ 371 (c)(1),
(2) Date: Dec. 13, 2022

(87) PCT Pub. No.: WO2021/253069
PCT Pub. Date: Dec. 23, 2021

(65) Prior Publication Data

US 2023/0228137 A1 Jul. 20, 2023

(30) Foreign Application Priority Data

Jun. 16, 2020 (AU) ................................ 2020901986

(51) Int. Cl.
*E05D 7/14* (2006.01)
*E05D 15/58* (2006.01)
(Continued)

(52) U.S. Cl.
CPC ............. *E05D 7/14* (2013.01); *E05D 15/581* (2013.01); *E05F 11/54* (2013.01); *E06B 3/5018* (2013.01); *E06B 5/113* (2013.01); *E06B 5/168* (2013.01)

(58) Field of Classification Search
CPC ... E05G 1/026; E06B 5/16; E06B 5/11; E06B 3/50; E06B 3/32; E06B 3/5018;
(Continued)

(56) References Cited

U.S. PATENT DOCUMENTS 200,823 A * 3/1878 Damon ..................... E05D 7/14 16/238
901,425 A * 10/1908 Damon ..................... E05D 7/14 16/275
(Continued)

FOREIGN PATENT DOCUMENTS

WO WO-9946470 A1 * 9/1999 ............. E05D 15/48
WO 2006/094368 A1 9/2006
(Continued)

*Primary Examiner* — Suzanne L Barrett
(74) *Attorney, Agent, or Firm* — BakerHostetler

(57) ABSTRACT

A door and door jamb arrangement, for securing the opening of a secure space. The door and door jamb arrangement include a safe container, a safe room or a lockable container. The door jamb arrangement further including a door and the opening. The door is adapted to be hingedly attached to a door jamb with a hinge arrangement. The door has a hinged edge or end, and non-hinged edges or ends including a top, bottom and a remote edge. The opening has a planar space defined by the door jamb and is adapted to be closed by the door in a closed position. A hinge axis of the hinge arrangement is adapted, near or adjacent the closed position, to move laterally relative to one or both of the door or the door jamb. The hinge axis of the hinge arrangement is adapted, near or adjacent the closed position, to move at least a door portion of two adjacent edges of the door relative to corresponding and adjacent jamb portions of an edge of the door jamb between overlapping and non-overlapping positions. The door is adapted to move vertically relative to the door jamb.

20 Claims, 14 Drawing Sheets

(51) Int. Cl.

| | |
|---|---|
| ***E05F 11/54*** | (2006.01) |
| ***E06B 3/50*** | (2006.01) |
| ***E06B 5/11*** | (2006.01) |
| ***E06B 5/16*** | (2006.01) |

(58) Field of Classification Search

CPC ......... E06B 5/113; E06B 5/168; E05D 15/58; E05D 3/06; E05D 7/081; E05D 7/00; E05D 7/14; E05D 15/581; E05B 65/00; E05F 11/54

USPC ............................................................ 109/70

See application file for complete search history.

(56) References Cited

U.S. PATENT DOCUMENTS

| | | | | | |
|---|---|---|---|---|---|
| 3,394,428 | A * | 7/1968 | Peterson | E05D 7/081 16/354 |
| 3,788,689 | A * | 1/1974 | Lloyd | E05C 19/006 292/241 |
| 4,548,330 | A * | 10/1985 | Hewitt | H02B 1/066 109/70 |
| 4,679,353 | A * | 7/1987 | Langenbach | E05D 3/08 49/257 |
| 6,659,155 | B1 * | 12/2003 | Mlenek | E05D 7/081 160/369 |
| 2006/0037519 | A1 | 2/2006 | Dunstan | |

FOREIGN PATENT DOCUMENTS

| | | | | |
|---|---|---|---|---|
| WO | 2007/006098 | A1 | 1/2007 | |
| WO | WO-2018107051 | A1 * | 6/2018 | E05B 65/087 |
| WO | 2019/140480 | A1 | 7/2019 | |

* cited by examiner

OK TO ENTER: /S.L.B/

DIAGONALLY TRANSLATING DOOR

CROSS-REFERENCE TO RELATED APPLICATIONS

This application is a National Stage of International patent application PCT/AU2021/050543, filed on Jun. 2, 2021, which claims priority to foreign Australian patent application No. AU 2020901986, filed on Jun. 16, 2020, the disclosures of which are incorporated by reference in their entirety.

FIELD OF INVENTION

This invention relates to a diagonally translating door. More particularly, this invention relates to a diagonally translating door which is adapted to translate in a direction with vector components both perpendicular and parallel to an axis of a hinge between the door and a doorjamb.

BACKGROUND ART

The following references to and descriptions of prior proposals or products are not intended to be, and are not to be construed as, statements or admissions of common general knowledge in the art. In particular, the following prior art discussion should not be assumed to relate to what is commonly or well known by the person skilled in the art, but to assist in the inventive process undertaken by the inventor (s) and in the understanding of the invention.

Door for safes have been described which include a door hinged to a doorjamb where the door, in the closed position, does not overlap any surfaces of the doorjamb which face an interior of the safe.

An object of the present invention is to ameliorate one or more of the aforementioned disadvantages of the prior art or to at least provide a useful alternative thereto.

STATEMENT OF INVENTION

The invention according to one or more aspects may be as defined in the independent claims. Some optional and/or preferred features of the invention are defined in the dependent claims.

Accordingly, in one aspect of the invention there is provided:

A door and doorjamb arrangement, for securing the opening of a secure space, including a safe container, a safe room or a lockable container, the doorjamb arrangement including:

a door adapted to be hingedly attached to a doorjamb with a hinge arrangement, the door having a hinged edge or end, and non-hinged edges or ends including a top, bottom and remote edge; and an opening having a planar space defined by the doorjamb and adapted to be closed by the door in a closed position, wherein:

(a) a hinge axis of the hinge arrangement is adapted, near or adjacent the closed position, to move:

(i) laterally relative to one or both of the following:

the door; and the doorjamb; and (ii) at least a door portion of two adjacent edges of the door relative to corresponding and adjacent jamb portions of an edge of the doorjamb between overlapping and non-overlapping positions, and (b) the door is adapted to move vertically relative to the doorjamb.

Door Movement

The door may be adapted to move laterally relative to the hinge axis and vertically or parallel relative to the hinge axis. Preferably, the door is adapted to move in a direction or along a path of travel with vector components laterally or perpendicular relative to the hinge axis and with vector components parallel to the hinge axis. Therefore, the door may be adapted to move diagonally relative to the hinge axis, including, for example, through a substantially horizontal plane or upwards and sidewards through an upright or substantially vertical plane.

The door may be adapted to move laterally and parallel to the hinge axis at the same time or move laterally in a first movement and parallel in a second movement. Preferably, the door is adapted to move diagonally relative to the hinge axis.

The movement of the door relative to the hinge axis may be actuated by rotation or movement of a handle of the safe, movement of the door, a electronic or pneumatic actuation device or a manual actuation device. Rotation of the handle may be adapted to provide the force or torque to move the door relative to the hinge axis.

The electronic or pneumatic actuation device may include an electric motor, solenoid, pneumatic pump or pneumatic piston. The manual activation device may include a lever or other feature separate to the handle which is adapted to be actuated manually by a user. Alternatively, the hinge axis may be adapted to move relative to the doorjamb. In this specification, all references to movement of the door relative to the hinge axis or actuating means to move the door relative to the hinge axis may alternatively apply to movement of the hinge axis relative to the doorjamb.

Hinge Arrangement

In another embodiment, the hinge arrangement may include at least two hinge axes. The hinge arrangement may include two hinge axes. In this specification, references to a single "hinge axis" refers to any one of the hinge axes of the hinge arrangement, which preferably includes multiple hinge axes.

Each of the two hinge axes may be parallel with respect to each other. The hinge arrangement may include a first hinge with a first hinge axis and a second hinge with a second hinge axis. The first hinge may be adapted to be fixed to the doorjamb and the second hinge may be adapted to be fixed to the door. The first hinge may be adapted to move in a direction or path which includes vector components which are lateral and parallel to the first hinge axis relative to the door or doorjamb. The second hinge may be adapted move in a direction or path which includes vector components which are lateral and parallel to the second hinge axis relative to the door or doorjamb.

Preferably, the door is adapted to move in a direction or path which is parallel with the second hinge. In other words the door is adapted to slide along or parallel to the second hinge axis. Preferably, the second hinge axis is adapted to move in a direction or along a path which is lateral with the doorjamb. Therefore, together, the above movements combine to translate the door diagonally relative to either the first or second hinge axis.

Door Translating Means

Also disclosed herein, the hinge arrangement may include door translating means to move the door relative to the hinge axis or the hinge axis relative to the doorjamb. The door translating means may include the at least one hinge axis. The door translating means may include cylindrical gears which are adapted to mesh with linear gears to affect movement of the door laterally or parallel to the hinge axis. The door translating means may include tapered surfaces which the door or hinge are adapted to move along or around to affect vertical movement of the door relative to the hinge axis or the hinge axis relative to the doorjamb. The tapered surfaces may include helical surfaces surrounding the hinge axis. The door may include contact surfaces which are adapted to contact helical surfaces of the hinge arrangement to affect movement of the door parallel to the hinge axis.

Preferably, in addition to the at least two hinge axes, the door translating means includes a lever mechanism. The lever mechanism may include a lever or rod spanning between either the door and the first hinge axis or the doorjamb and the first hinge axis. The lever mechanism is adapted to either move the door in a direction parallel to the first hinge axis relative to the first hinge or move the second hinge in a direction parallel to the second hinge axis relative to the doorjamb.

The lever mechanism may be actuated by movement of the door relative to the door jamb. The lever mechanism may be actuated by movement of the door or doorjamb relative to the hinge arrangement. Preferably, the lever mechanism is actuated by movement of the handle. The handle adapted to lock and unlock the door from the doorjamb. The handle adapted to also actuate bolts to lock the door to the doorjamb.

Preferably, the lever mechanism includes a lever which includes three pivot connections. The three pivot connections are respectively connected to a locking mechanism at a first end of the lever, the door centrally on the lever and a central rod of the first hinge at a second end of the lever. The locking mechanism may include the handle. The handle is mechanically connected to the lever. The lever mechanism is adapted such that, as the handle is turned to lock the door to the doorjamb, the locking mechanism lifts up the first end of the lever and therefore pulls down the second end of the lever thereby lifting he door relative to the first hinge. The first hinge may be attached to the door with a circumferential housing or bearing such that the first hinge may move parallel to the first hinge axis relative to the door but not laterally. Therefore the hinge arrangement may be configured such that the door may slide up and down, longitudinally along the first hinge.

Guard and Guard Support

In another embodiment, the door further includes a door guard. The door guard may include a plate or beam. The door guard may be adapted to extend along and protrude below the bottom edge of the door. The door guard may be fixed to the vertical rod or the second hinge. The door guard may be adapted to maintain its elevation or vertical position relative to the doorjamb as the door moves vertically relative to the doorjamb. The door guard may therefore be adapted to provide a barrier against unauthorised entry of a tool between the bottom edge of the door and the bottom edge of the door jamb. The door guard may be fixed to the hinge. The door guard may be attached to the hinge with a pivot connection for the support that permits rotational movement but not vertical movement relative to the hinge. More specifically, the door guard may be attached to the vertical rod with the pivot connection.

The door and doorjamb arrangement may further include a door guard support. The door guard support may support the door guard for movement relative to the door. The door guard support may include a support beam. The door guard may be adapted to extend through the support beam. Advantageously, the support beam may provide lateral support to the guard. Preferably, the support beam is fixed to the door.

The door guard support may include guides that resist lateral movement of the door guard relative to the door. The guides may be partially located in and may extend through the support beam. The guides may comprise one or more slots to receive door guard translating members. The guides and/or the translating members may be aligned parallel to the hinge axis. The translating members may be in the form of rods or bars.

The translating members may extend between the upper beam attached by an axially stationary pivot connection to the hinge rod, and the door guard. The upper beam and the door guard may be aligned substantially parallel to each other. The upper beam and the door guard may be aligned substantially perpendicular to the translating members.

The door guard may include at least one beam, hook or plate which is adapted to hook onto a component of the doorjamb. The door guard support may be adapted to be located adjacent the door guard to provide lateral support to the door guard in a direction perpendicular to a main plane of the door.

The door guard may be adapted to hook into a jamb guard. The jamb guard may be adapted to be fixed to the door jamb. The jamb guard may be adapted to interlock with the door guard as a result of the motion of the door in a first translational direction which is parallel to the first hinge axis.

The door guard is adapted to protect a gap between the bottom edge of the door and the bottom edge of the doorjamb where the door is subjected to diagonal movement relative to hinge. Whilst the door pivot connections move along the hinge to expose the gap, the door guard pivot connection(s) remains axially stationary on the hinge rod, so that the door guard covers the gap in the closed position. The door guard overlaps or engages with the jamb guard to protect the gap from unauthorised intrusion.

It will be appreciated that any of the features described herein may be used in any combination, and that the invention as described in respect of the second aspect may have the specific features referred to above in respect of the invention as described in respect of the first aspect.

Lever Actuation Means

Also disclosed herein, the lever may include lever actuation means. The lever actuation means may include a spring, pneumatic piston, solenoid or other mechanisms or devices adapted to apply force to the lever. Preferably, the lever actuation means includes a spring. Preferably, the spring is attached to two connected components of the lever and are adapted to apply force for actuation or limiting fast movement of the door relative to the hinge.

BRIEF DESCRIPTION OF THE DRAWINGS

The invention may be better understood from the following non-limiting description of preferred embodiments, in which.

REFERENCE KEY

Figure 1A:
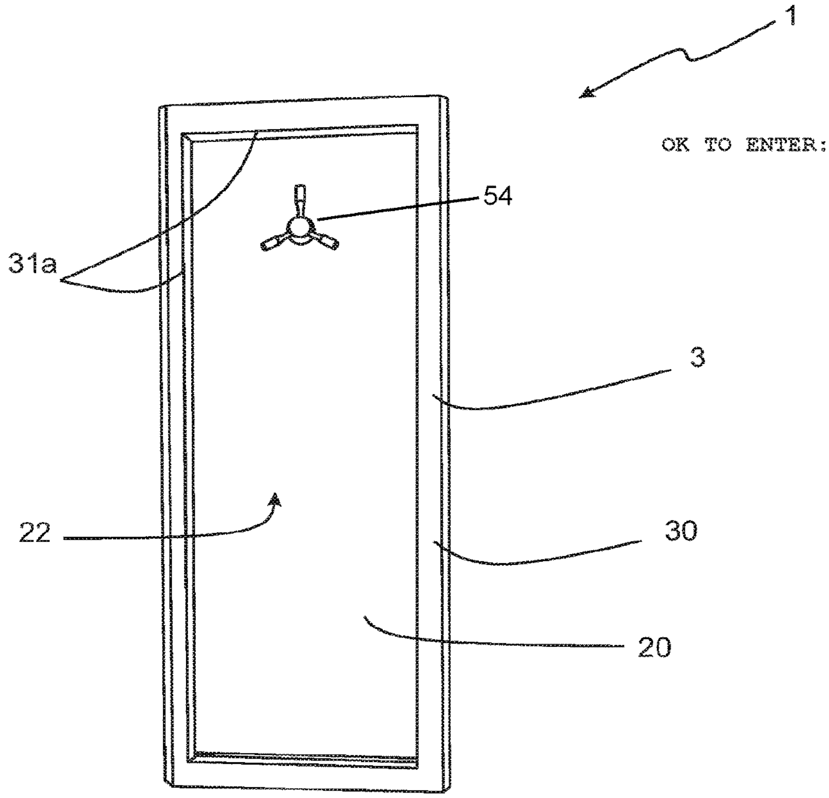
FIG. 1*a* is a front perspective view of the door and doorjamb arrangement with a door in a closed position according to a first embodiment of the invention.
Figure 1B:
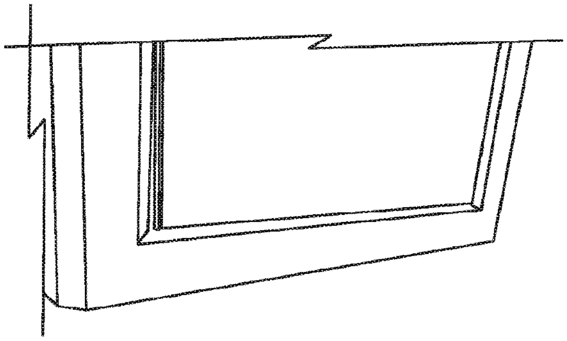
FIGS. 1*b* and 1*c* are perspective views of the lower portion of the door and jamb shown in FIG. 1.
Figure 1C:
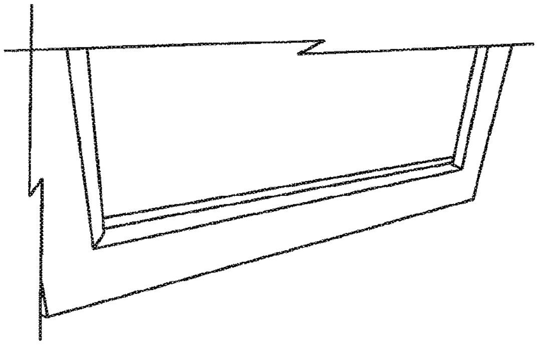
Figure 2:
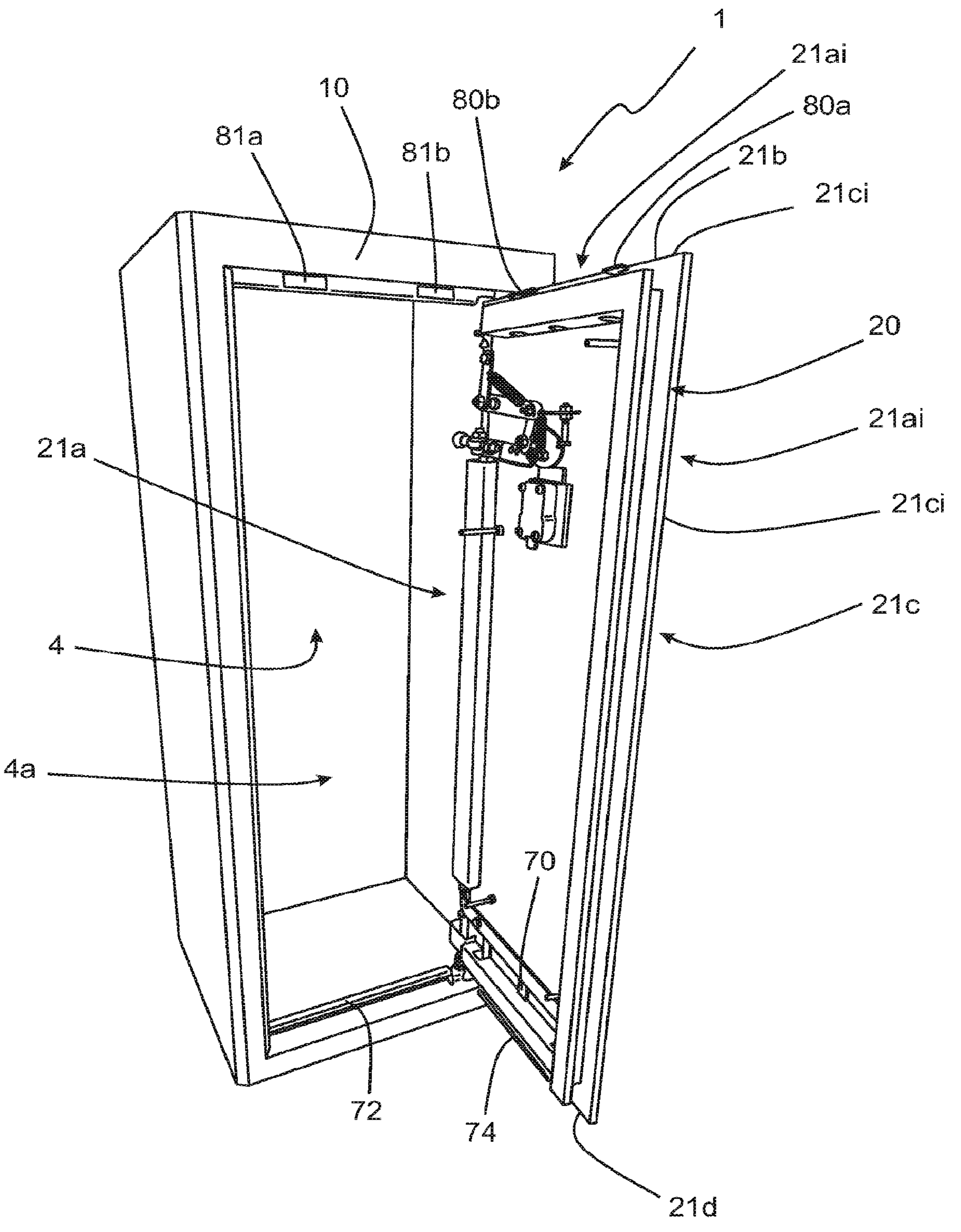
FIG. 2 is a front perspective view of the door and doorjamb arrangement with the door in an open position.
Figure 3:
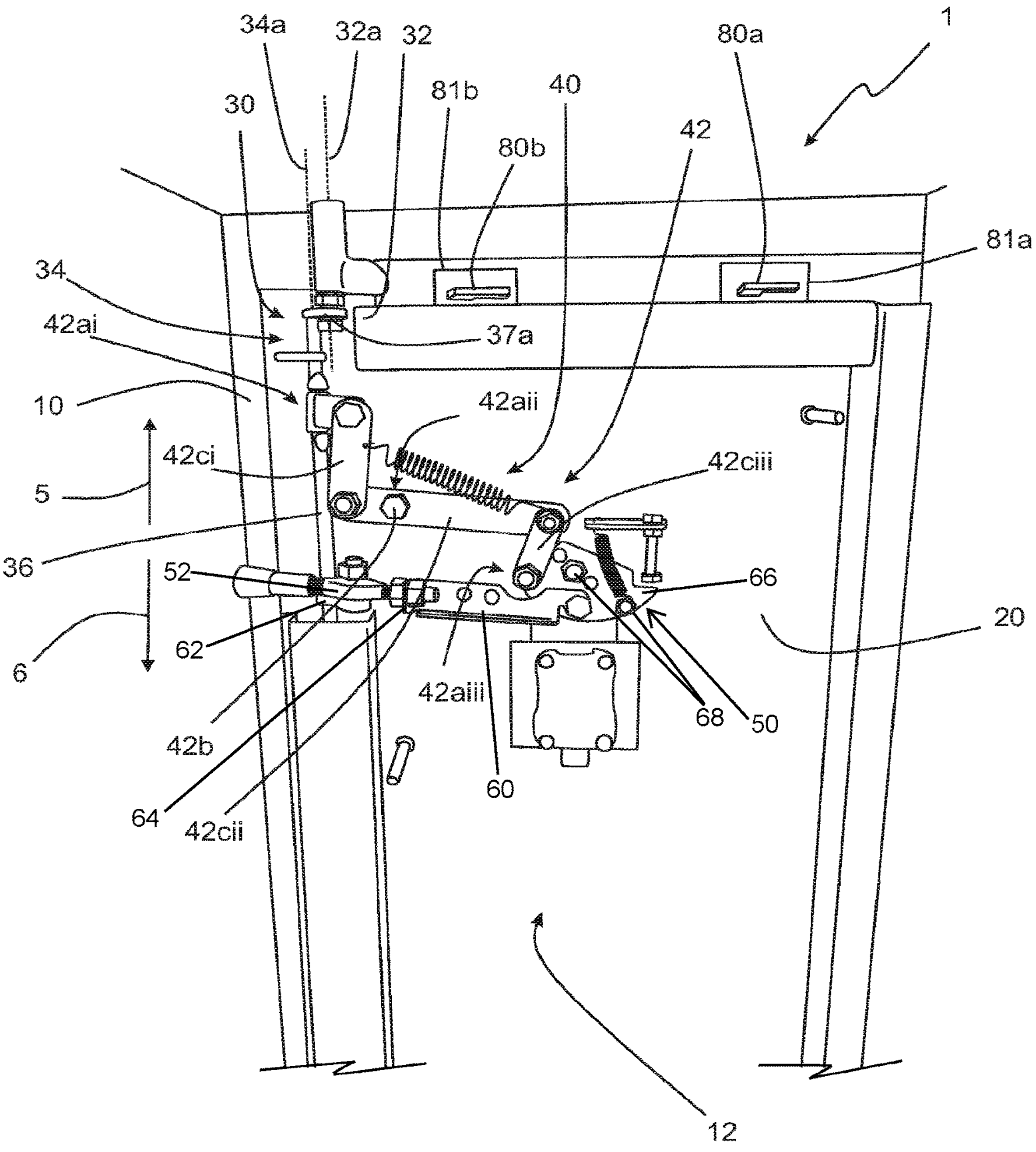
FIG. 3 is an internal perspective view of the door and doorjamb arrangement with the door in the closed position.
Figure 4:
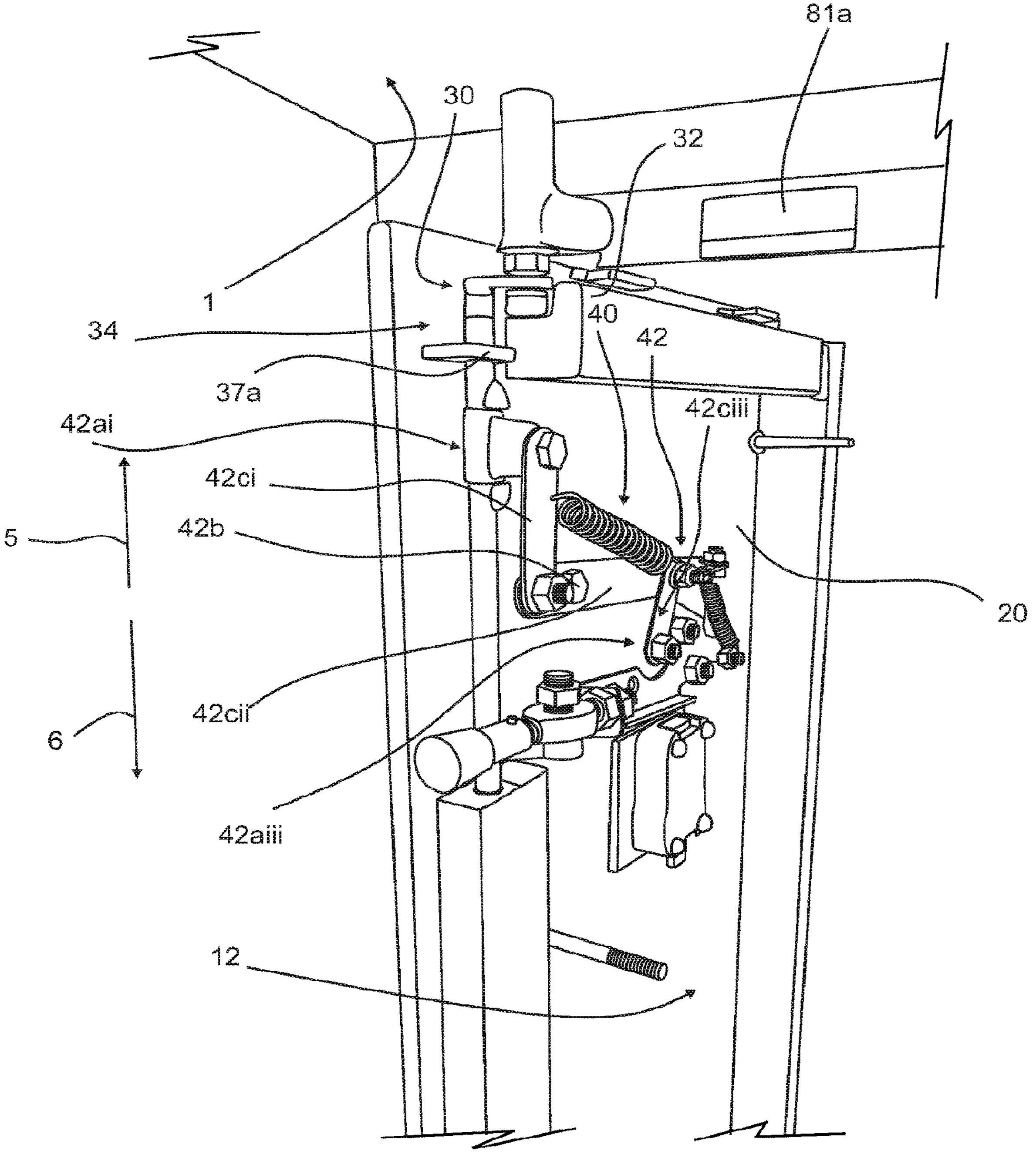
FIG. 4 is an internal perspective view of the door and doorjamb arrangement with the door in the open position.
Figure 5:
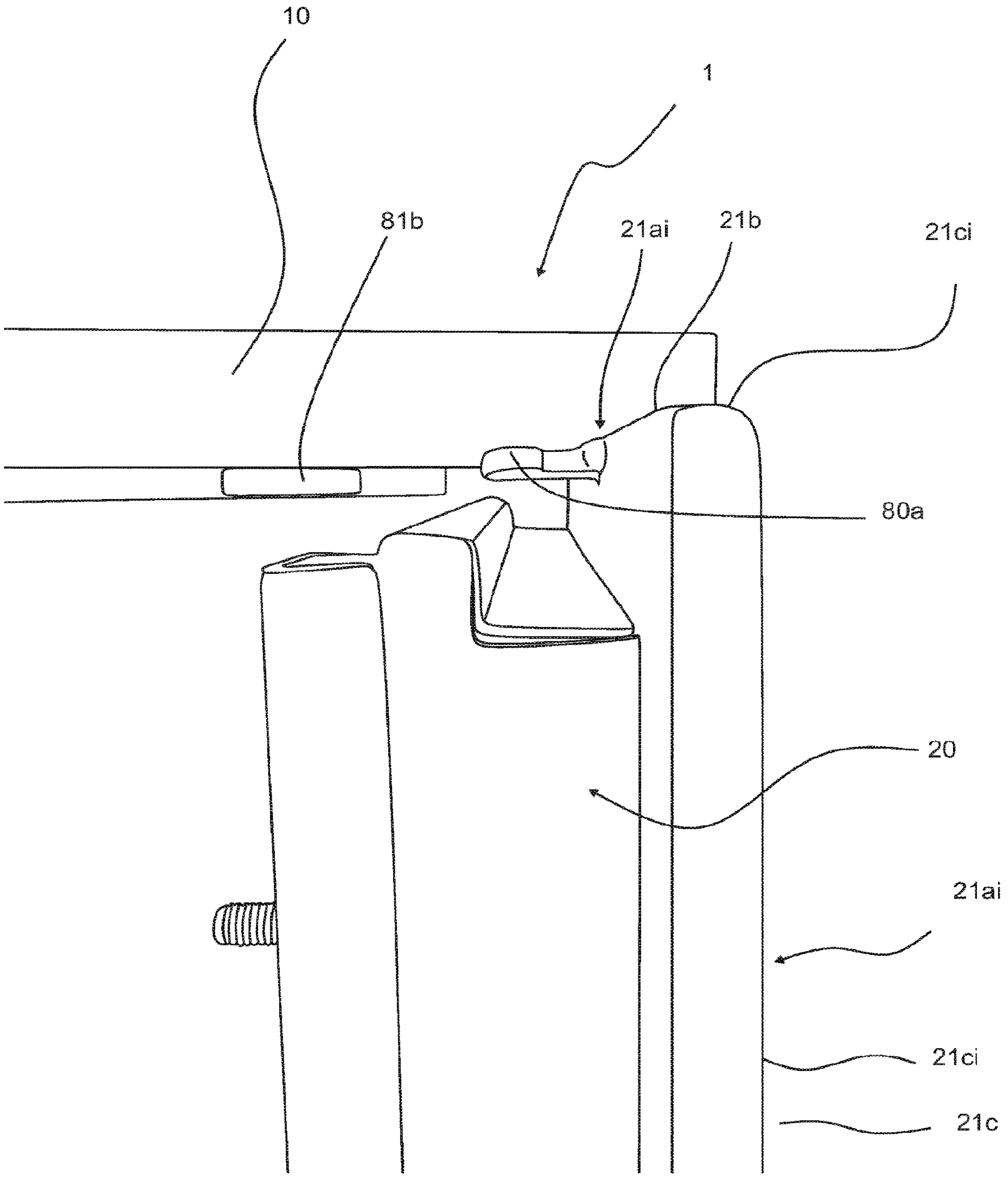
FIG. 5 is a close up view of an upper end of the door.
Figure 6:
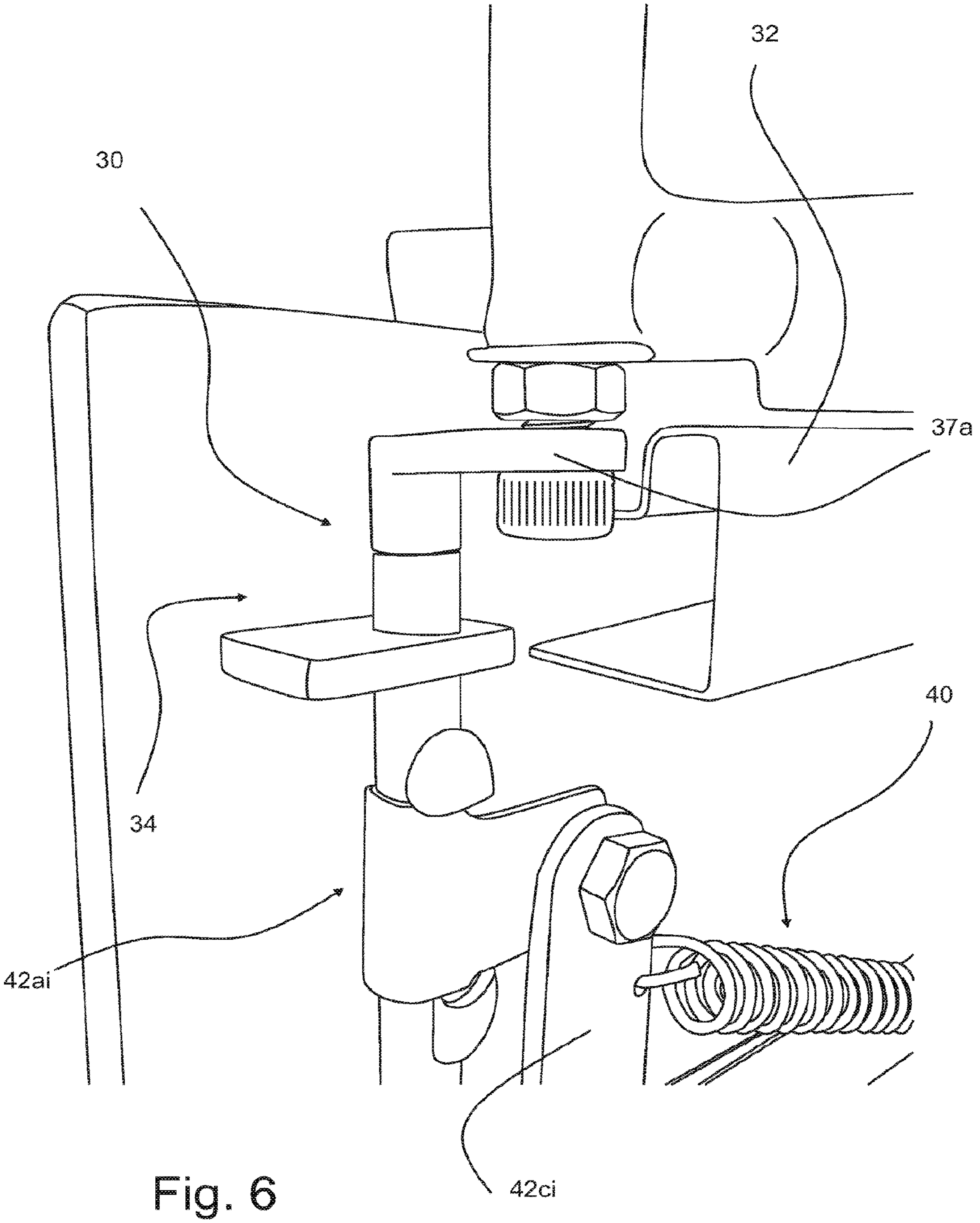
FIG. 6 is a close up view of an upper portion of a hinge of the door and door jamb arrangement.
Figure 7:
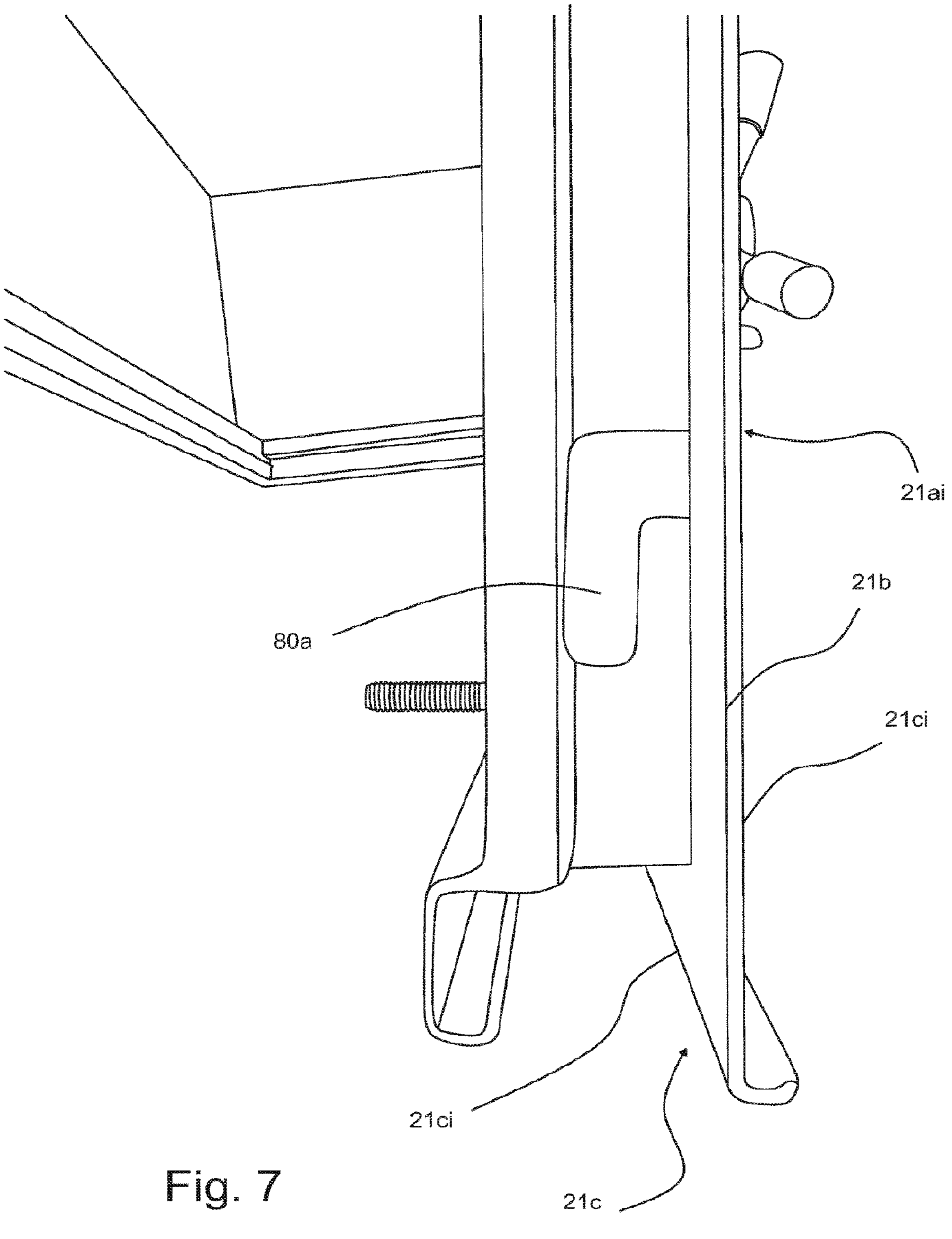
FIG. 7 is a top perspective view of the door.
Figure 8:
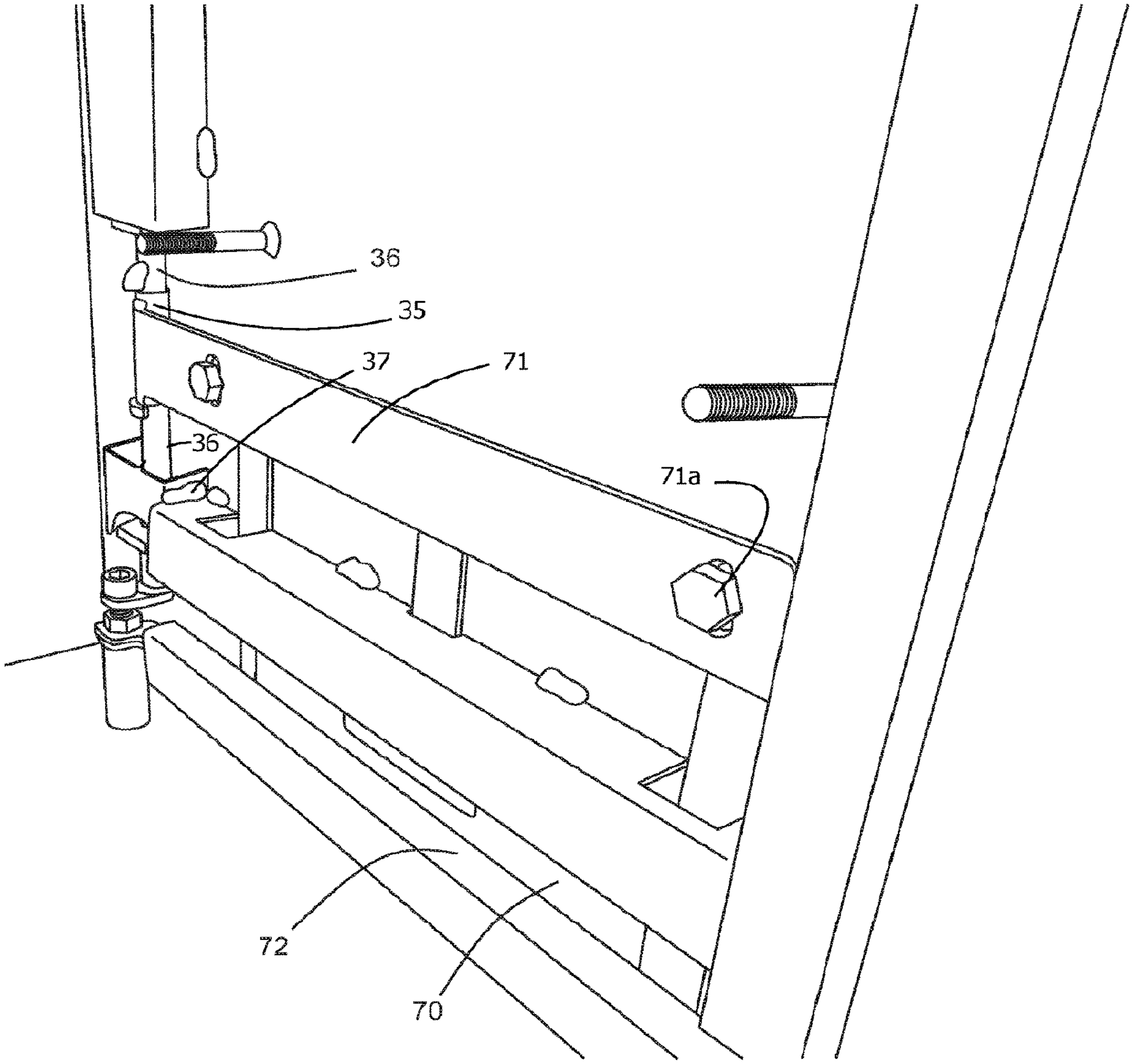
FIG. 8 is an internal perspective view of the door and doorjamb arrangement showing a guard.
Figure 9:
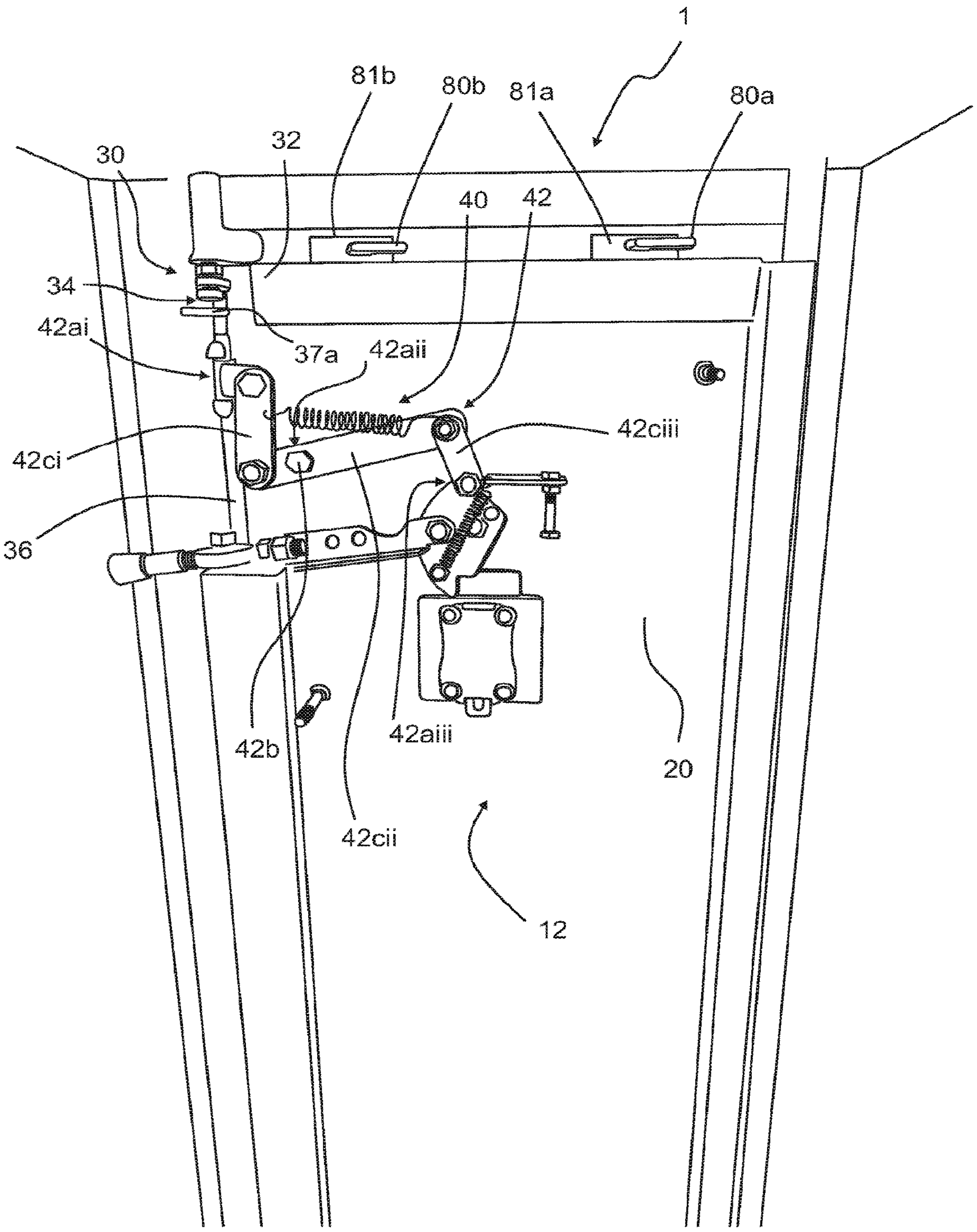
FIG. 9 is an internal perspective view of the door and doorjamb arrangement showing the door in a raised position relative to a hinge and the door in the open position.
Figure 10:
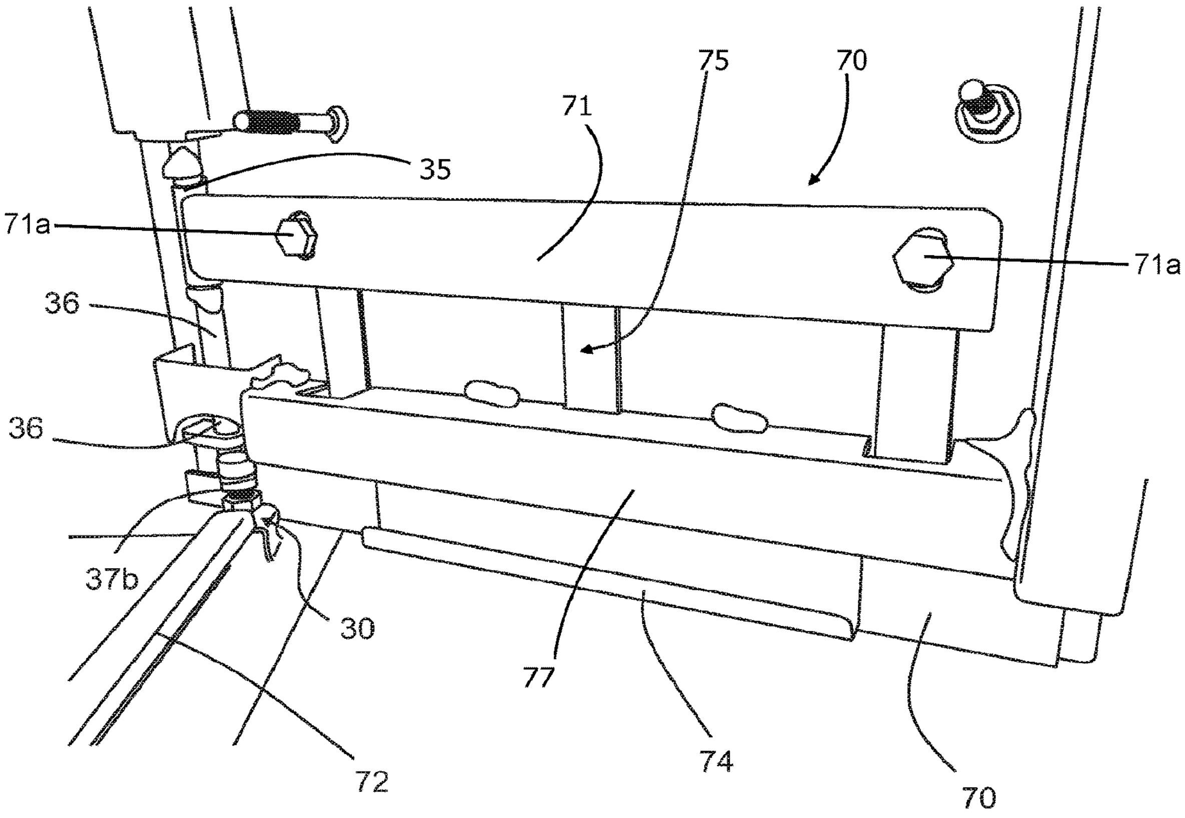
FIG. 10 is a perspective view of a lower portion of the door and hinge assembly in the open position.
Figure 11:
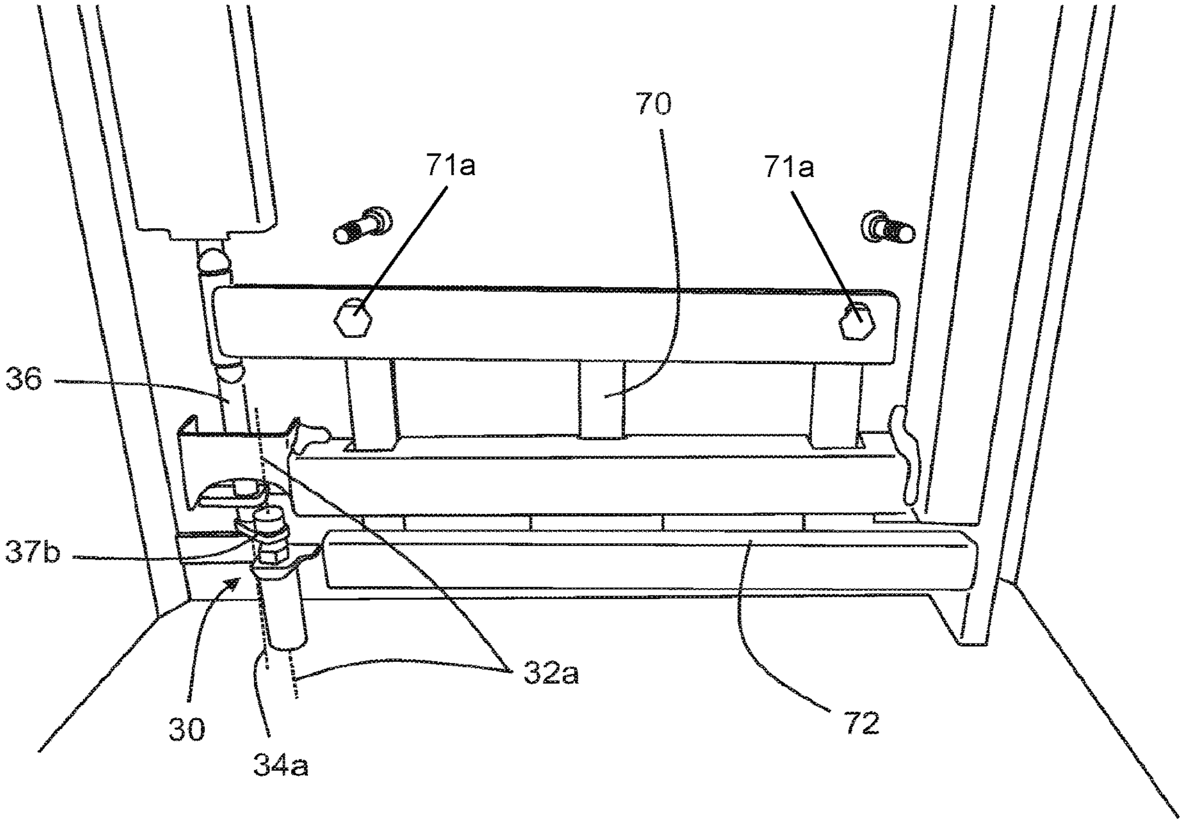
FIGS. 11-13 are perspective views of a lower portion of the door and hinge assembly in the closed position.
Figure 12:
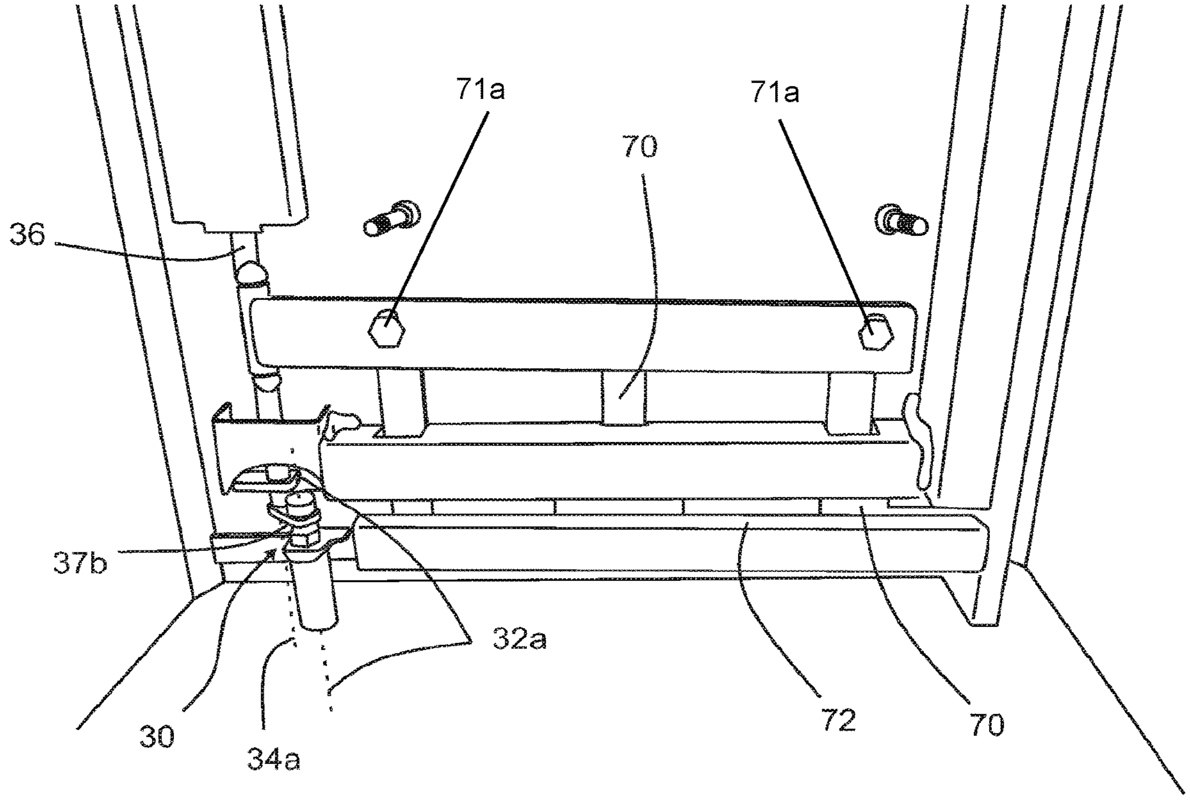
Figure 13:
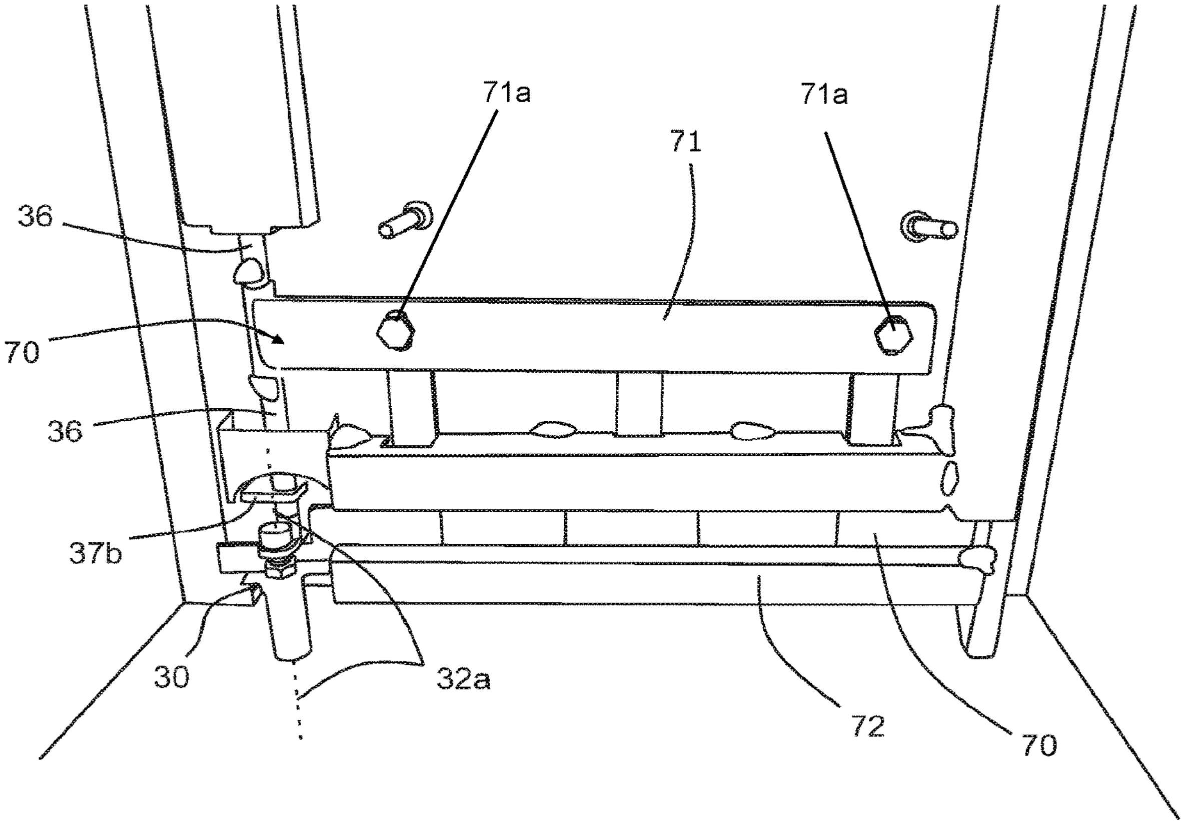
Figure 14:
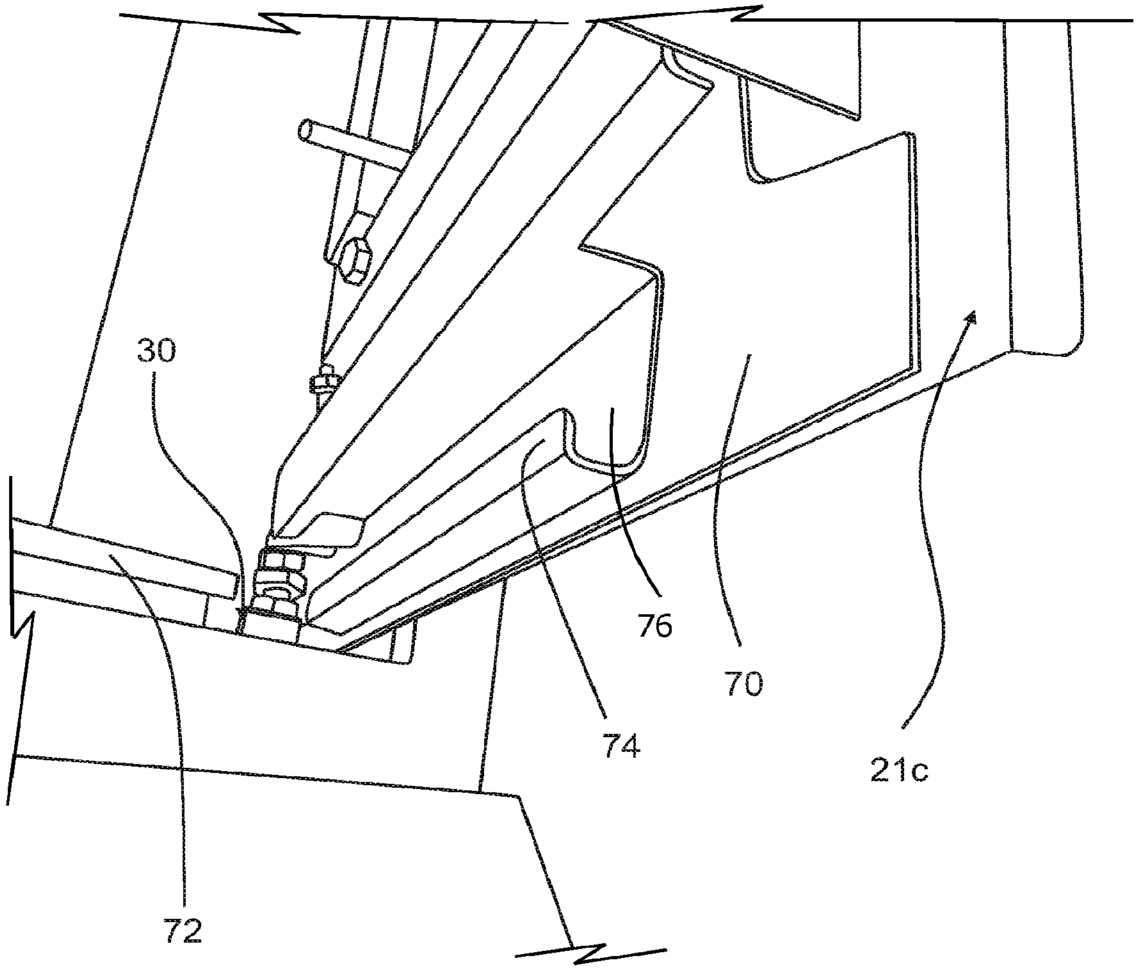
FIG. 14 is a perspective view of a lower portion of the door and hinge assembly in the open position.

Reference Nos.

| Description | No. |
|---|---|
| Door and door jamb arrangement, hinge arrangement | 1 |
| Secure space | 2 |
| Safe container, safe room or a lockable container | 3 |
| Opening | 4 |
| Planar space | 4a |
| First translational direction | 5 |
| Second translational direction | 6 |
| Door jamb | 10 |
| Inner side of the door jamb | 12 |
| Door | 20 |
| Hinged edge or end (of the door) | 21a |
| Non-hinged edges or ends (of the door) | 21b, c, d |
| Top edge (of the door) | 21b |
| Remote edge (of the door) | 21c |
| Bottom edge (of the door) | 21d |
| Door portion | 21ai |
| Two adjacent edges | 21bi, ci |
| Exterior of the door | 22 |
| Hinge arrangement, multi-axis hinge | 30 |
| Hinge axis, first hinge axis | 32a |
| First hinge | 32 |
| Adjacent jamb portions | 31a |
| Vertical rod | 36 |
| Upper radially extending arm (of the vertical rod) | 37a |
| Lower radially extending arm (of the vertical rod) | 37b |
| Second hinge axis | 34a |
| Second hinge | 34 |
| Support pivot connection | 35 |
| Hinge cover | 36 |
| Weld spots indicating fixed components | 37 |
| Lever mechanism | 40 |
| Lever | 42 |
| First end of the lever | 42ai |
| Intermediate location on the lever | 42aii |
| Second end of the lever | 42aiii |
| Pivot connections (of the lever) | 42b |
| First component (of the lever) | 42ci |
| Second component (of the lever) | 42cii |
| Third component (of the lever) | 42ciii |
| Locking mechanism | 50 |
| Rotating component | 52 |
| Handle | 54 |
| Lateral component | 60 |
| Central radially extending arm | 62 |
| First arm (of the lateral component) | 64 |
| Second arm (of the lateral component) | 66 |
| Pivot connections (of the lateral arm) | 68 |
| Door guard | 70 |
| Rear side of the guard | 70a |
| Upper support beam | 71 |
| Fasteners attaching upper support beam to translating bar | 71a |

-continued

Reference Nos.

| Description | No. |
|---|---|
| members | |
| Jamb guard | 72 |
| Door guard hook | 74 |
| Translating bar members | 75 |
| Door guard plate | 76 |
| Door guard support | 77 |
| Two hooks | 80a, b |
| Two holes (of the door) | 81a, b |
| Two holes (of the door) | 81a, b |
| Two hooks | 80a, b |

DETAILED DESCRIPTION OF THE DRAWINGS

Preferred features of the present invention will now be described with particular reference to the accompanying drawings using the above reference key. However, it is to be understood that the features illustrated in and described with reference to the drawings are not to be construed as limiting on the scope of the invention. In describing the various embodiments of the invention, like features will be referred to using like references, with references for features of each embodiment generally preceded by 1, 2, 3, or followed by a Roman numeric sequence, such as i, ii, iii, etc. or an alphabetical sequence such as a, b, c, relative to the corresponding feature of the first embodiment. For example, a feature 10 of the first embodiment may represented as 110, 210, 310, (or n10), or 10*a*, 10*b*, 10*c*. (or 10*x*) or 10*i*, 10*ii*, 10*iii*, (or 10*r*) etc. in second, third and fourth embodiments, respectively.

A door and doorjamb arrangement 1 for securing the opening to a secure space 4 is shown. The door and doorjamb arrangement 1 includes a safe container, a safe room or a lockable container 3. The doorjamb arrangement 1 further includes a door 20 and an opening 4*a* to a secure space 4. The door 20 is adapted to be hingedly attached to a doorjamb 10 with a hinge arrangement 30. The door 20 has a hinged edge or end 21*a*, and non-hinged edges or ends 21*b, c, d* including a top 21*b*, bottom 21*d* and remote 21*c* edge. The opening 4*a* to the secure space 4 is a planar opening 4*a* defined by the doorjamb 10 and is adapted to be closed by the door 20 in a closed position. A hinge axis 32*a* of the hinge arrangement 30 is adapted, near or adjacent the closed position, to move laterally relative to one or both of the door 20 and the doorjamb 10. The hinge axis 32*a* of the hinge arrangement 30 is adapted, near or adjacent the closed position, to move at least a door portion 21*ai* of two adjacent edges of the door 21*bi*, ci relative to corresponding and adjacent jamb portions 31*a* of an edge of the doorjamb 10 between overlapping and non-overlapping positions. The door 20 is adapted to move vertically relative to the doorjamb 10.

The doorjamb 10 is fixed to a first hinge axis 32*a* of a first hinge 32 of the hinge arrangement 30 and the door 20 is fixed to a second hinge axis 34*a* of a second hinge 34 of the hinge arrangement 30. The first 32 and second 34 hinges form a multi-axis hinge 30. The first hinge 32 includes a first hinge axis 32*a* which is parallel to and offset from a second hinge axis 34*a*. The multi-axis hinge 30 enables the first hinge axis 32*a* to move laterally (in a direction which is perpendicular to the first axis) relative to the door 20. The multi-axis hinge 30 also enables the second hinge axis 34*a* to move laterally (in a direction which is perpendicular to the second axis) relative to the doorjamb 10. Therefore, the hinge arrangement 30 is adapted such that the door 20 may translate as well as rotate relative to the doorjamb 10.

The door 20 includes door translating means. The door translating means includes the hinge arrangement 30. The door translating means also includes a lever mechanism 40. The lever mechanism 40 is adapted to vertically move the door 20 relative to the second hinge 34. The lever mechanism 40 includes a lever 42. The lever 42 is attached to a locking mechanism 50 at a first end of the lever 42*aiii* and to a vertical rod 36 of the second hinge at a second end of the lever 42*ai*. The lever 42 is also attached to the door 20 at an intermediate location on the lever 42*aii*, between the first 42*ai* and second 42*aiii* ends. The attachments to the lever 42 are pivot connections 42*b*.

The lever 42 is made of multiple components attached end on end. The components (first 42*ci*, second 42*cii* and third 42*ciii* components) of the lever 42 are attached together with pivot connections 42*b*.

The first component 42*ciii* is attached to a rotating component 52 of the locking mechanism 50. The rotating component 52 is adapted to be actuated in the action of locking or unlocking the door 20 to the doorjamb 10. More specifically, the rotating component 52 is adapted to be actuated by a handle 54 of the locking mechanism 50. The handle 54 is located on an exterior of the door 22. The door and doorjamb arrangement 1 is adapted such that rotating the handle 54 in a first rotational direction both actuates locking bolts of the locking mechanism 50 to lock the door 20 to the doorjamb 10 and pushes the first component of the lever 42*ciii* upwards in a first translational direction 5. Pushing the first component 42*ciii* in the first translational direction 5 results in the lever 42 pivoting about its connection with the door 20. As the second component 42*cii* rotates, the third component 42*ci* is pulled downwards in a second translational direction 6, which is opposite the first translational direction 5. Pulling the third component 42*ci* in the second translational direction 6, moves the door 20 upwards, in the first translational direction 5 relative to the second hinge 34 and to the doorjamb 10. Therefore, the door and doorjamb arrangement 1 are adapted such that the lever 42 effects vertical translational movement of the door 20 relative to the doorjamb 10. Moreover, the locking mechanism 50 is adapted to actuate the lever 42 in the same movement or series of movements which locks and unlocks the door 20 from the doorjamb 10.

The lateral movement of the door 20 relative to the doorjamb 10 which is affected by the multi-axis hinge 30 is also actuated by the locking mechanism 50. Furthermore, the lateral movement of the door 20 relative to the doorjamb 10 is also actuated in the same movement of the locking mechanism 50 which both locks or unlocks the door 20 and effects vertical translation of the door 20 relative to the doorjamb 10. Therefore, as the door 20 is locked or unlocked, the door 20 translates in a direction or path which includes both vertical and horizontal vectors (parallel and perpendicular to the first 32*a* and second 34*a* hinge axes).

The lateral movement of the door 20 relative to the doorjamb 10 is also actuated by the locking mechanism 50 through a lateral component 60. The lateral component 60 extends and spans between the rotating component 52 and a central radially extending arm 62 of the vertical rod 36. The central radially extending arm 62 is an arm which extends radially from and is welded to the vertical rod 36. The lateral component 60 is fixed to the vertical rod 36 and extends outwards perpendicular to the rod. The lateral component 60 includes a first arm 64 which is attached to the rotating component 52 and a second arm 66 with pivot connections 68. The second arm 66 is also attached to the central radially extending arm 62 with a pivot connection 68. The door and doorjamb arrangement 1 is adapted such that actuation of the locking mechanism 50 to lock or unlock the door 20 to the doorjamb 10 also pushes or pulls the lateral component 60 and therefore the central radially extending arm 62. Since the central radially extending arm 62 is fixed to the vertical rod 36, movement of the central radially extending arm 62 rotates the vertical rod 36. The vertical rod 36 includes weld spots indicating fixed components 37 and upper and lower radially extending arms 37*a*. 37*b* at upper and lower ends or the vertical rod 36 respectively. The upper and lower radially extending arms 37*a*, 37*b* are fixed to the vertical rod 36 at first ends and attached to the first hinge 32 at second ends of the upper and lower radially extending arms 37*a*, 37*b*. Therefore, the locking mechanism 50 is adapted to rotate the second hinge 34 and therefore the door 20 about the first hinge axis 32*a* as the locking mechanism 50 is actuated to lock and unlock the door 20 to the doorjamb 10.

The door 20 is adapted to overlap the doorjamb 10 on an inner side of the doorjamb 12. The inner side of the doorjamb 12 being in the opening 4*a* of the secure space 4. The door 20 and hinge arrangement 30 are positioned relative to the doorjamb 10 such that the hinged edge of the door 21*a* overlaps a hinged edge of the doorjamb 10 without any translation of the door 20 relative to the door jamb 10. With the door 20 in the closed position, the door 20 is located further into the opening 4*a* of the secure space 4 than the doorjamb 10. In this position, the door 20 is then adapted to translate toward a remote edge of the doorjamb 10 such that the remote edge of the door 20 overlaps the remote edge of the doorjamb 10. As the door 20 translates toward the remote edge of the doorjamb 10, the door 20 also translates toward a top edge of the doorjamb 10, also overlapping the top edge of the doorjamb 10. In this position, the hinged edge of the doorjamb 10 is also still overlapping the hinged edge of the door 21*a*. However, in this position the bottom edge of the door 20 is located above and not overlapping the bottom edge of the doorjamb 10.

The door 20 further includes a door guard 70. The door guard 70 includes integrally formed components, including a door guard hook 74, a plate 76, translating bar members 75 and an upper beam 71, that act as a unitary piece to remain axially stationary relative to the second hinge 34. The upper support beam 71 includes fasteners 71*a* that attach the upper support beam 71 to the translating bar members 75. Effectively, the door guard hook 74 comprises engaging folded hook portion extending from, and unitarily formed with, the plate 76. The door guard hook 74 is adapted to retractably extend from the bottom edge of the door 20. The door guard 70 is attached to the vertical rod 36 of the second hinge 34 with a pivot connection 35 of the door guard 70. The pivot connection 35 permits rotation of the door guard 70 around the vertical rod 36 but does not permit vertical movement of the door guard 70 relative to the vertical rod 36. Therefore, the door guard 70 remains at the same elevation relative to the vertical rod 36 when the container is an upright unit and the door 20 remains in a substantially vertical plane. The door guard 70 extends substantially or completely along an entire length of the bottom edge of the door 21*d*. The door guard 70 may be adapted to hook into a jamb guard 72. The jamb guard 72 may also be adapted to be fixed to the door jamb 10. The jamb guard 72 may be adapted to interlock with the door guard 70 as a result of the motion of the door in a first translational direction 5, which is parallel to the first hinge axis 32*a*.

The door guard 70 is adapted to maintain its elevation relative to the doorjamb 10. Therefore, as the door 20 moves vertically, the door guard 70 remains adjacent to and within 5 mm of the bottom edge of the doorjamb 10. The doorjamb 10 includes a jamb guard 72. The jamb guard 72 is adapted to interlock with a guard support 77 of the door 20 as a result of the motion of the door 20 in the first translational direction 5. The door guard support 77 extends adjacent and substantially along the entire length of a rear side of the door guard 70. The rear side of the door guard 70 faces the opening 4*a* of the secure space 4 when the door 20 is in the closed position as shown in FIG. 1*a*.

The door 20 further includes a second guard support and door member on a top end of the door 21*b*. The second guard support includes two hooks 80*a, b* which are adapted to hook into two holes in the doorjamb 81*a, b* respectively upon lateral translation of the door 20 relative to the doorjamb 10.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, terms such as "apparatus", "means", "device" and "member" may refer to singular or plural items and are terms intended to refer to a set of properties, functions or characteristics performed by one or more items or components having one or more parts. It is envisaged that where an "apparatus". "means". "device" or "member" or similar term is described as being a unitary object, then a functionally equivalent object having multiple components is considered to fall within the scope of the term, and similarly, where an "apparatus", "assembly", "means", "device" or "member" is described as having multiple components, a functionally equivalent but unitary object is also considered to fall within the scope of the term, unless the contrary is expressly stated or the context requires otherwise. In the present specification, the phrase "and/or" refers to severally or any combination of the features. For example, the phrase "feature 1, feature 2 and/or feature 3" includes within its scope any one of the following combinations: Feature 1 or feature 2 or feature 3; feature 1 and feature 2 or feature 3; feature 1 or feature 2 and feature 3; feature 1 and feature 3 or feature 2; feature 1 and feature 2 and feature 3.

The meaning of descriptive, precise or absolute terms such as "flexed", "normal". "parallel". "horizontal". "vertical" or "fully" includes the preceding qualifier "substantially or almost", unless the context or contrary is expressly indicated.

Qualifying relative terms, such as "relatively", "sufficiently", "near", "almost" or "substantially", may be taken to indicate a variation in an absolute value of between 0) ° and 10° or between 0% and 10%, relative to the absolute value. For example, "near horizontal" may be taken to mean any orientation between 0°) and 10° relative to the horizontal.

Orientational terms used in the specification and claims such as vertical, horizontal, top, bottom, upper and lower are to be interpreted as relational and are based on the premise that the component, item, article, apparatus, device or instrument will usually be considered in a particular orientation, which will usually be apparent from the context.

In the present specification, the term "integral" means formed of one body in a single process. In particular, the term "integrally formed" means formed of the one body without post-forming attachment of separately formed component parts. That is, "integrally formed" and the similar term "unitarily formed" mean formed in a single forming process and do not include post-forming attachment of component parts by means of fastener or other component fixing substances or methods.

The articles "a" and "an" are used herein to refer to one or to more than one (i.e. to at least one) of the grammatical object of the article. By way of example, "an element" means one element or more than one element.

It will be appreciated by those skilled in the art that many modifications and variations may be made to the methods of the invention described herein without departing from the spirit and scope of the invention. The features and components of each of the embodiments of the invention described in the detailed description and/or depicted in the accompanying drawings may be interchangeable as required, with regard to functional equivalency and compatibility. A feature or component described with reference to one but not all embodiments, if functionally and dimensionally compatible as an addition with another embodiment herein described, or substitutable with a corresponding feature or component of that other embodiment in relation to which it has not been expressly described, should be read as a potential addition or substitution to that other embodiment and as being within the scope of the invention. Furthermore, in considering a feature or component that is described in relation a particular embodiment but may be omitted from the embodiment without losing the functionality characterising the invention and without departing from the scope of the invention, unless the context and expressions used in describing the embodiment imputes that the feature or component is essential to the invention as broadly described, the omittable feature or component may be read as not being included in the embodiment.

The invention maybe described in terms of provisional claims that may assist the skilled reader in understanding the various aspects and preferments of the invention. However, these provisional claims are not to be construed as defining statements of the invention. It will be appreciated that other forms, aspects and preferred features of the invention and its embodiments described herein may ultimately be included in the claims defining the invention in the specifications of complete, international or national applications (or their subsequent corresponding patent grants) that may claim priority from the provisional application accompanying this specification. In this context, the following non-limiting claims assist to better describe the invention:

The invention claimed is:

1. A door and door jamb arrangement, for securing the opening of a secure space, including a safe container, a safe room or a lockable container, the door jamb arrangement including:

a door adapted to be hingedly attached to a door jamb with a hinge arrangement, the door having a hinged edge or end, and non-hinged edges or ends including a top, bottom and remote edge; and an opening having a planar space defined by the door jamb and adapted to be closed by the door in a closed position, wherein:

(a) the hinge arrangement including a hinge having a hinge axis, wherein the hinge arrangement is adapted, near or adjacent the closed position:

(i) to move the hinge axis laterally relative to one or both of the following:

the door; and the door jamb; and (ii) to move at least a door portion of two adjacent edges of the door relative to corresponding and adjacent jamb portions of an edge of the door jamb between overlapping and non-overlapping positions; and (b) the door includes a locking mechanism which is adapted to move the door vertically relative to the door jamb.

2. The door and door jamb arrangement as claimed in claim 1, wherein the door includes a lever which spans between the locking mechanism and the hinge arrangement.

3. The door and door jamb arrangement as claimed in claim 2, wherein the lever is adapted to lift the door relative to the hinge arrangement and the door jamb as the locking mechanism is actuated.

4. The door and door jamb arrangement as claimed in claim 2, wherein the lever includes a pivot connection with the door.

5. The door and door jamb arrangement as claimed in claim 2, wherein the lever includes a spring attached between the different components of the lever or between the lever and the door, the spring adapted to assist in lifting the door relative to the hinge arrangement and the door jamb.

6. The door and door jamb arrangement as claimed in claim 1, wherein the door further includes a guard located at a base of the door, the guard adapted to maintain a vertical position as the door moves relative to the hinge arrangement and the door jamb.

7. The door and door jamb arrangement as claimed claim 6, wherein the guard is attached to the hinge arrangement.

8. The door and door jamb arrangement as claimed in claim 1, wherein the door includes a guard support which is adapted to engage with a door support upon movement of the door relative to the hinge arrangement and the door jamb.

9. The door and door jamb arrangement as claimed in claim 1, wherein the hinge arrangement is a multi-axis hinge including a first hinge having a first hinge axis, and a second hinge having a second hinge axis, wherein the hinge arrangement is adapted, when the door is near or adjacent the closed position, to move the second hinge axis laterally relative to the first hinge axis.

10. The door and door jamb arrangement as claimed in claim 9, wherein the first hinge is affixed to the door jamb and the second hinge is affixed to the door.

11. The door and door jamb arrangement of claim 10, wherein the locking arrangement is adapted to move the door and the second hinge axis laterally relative to the door jamb and the first axis simultaneously when the door moves vertically relative to the door jamb.

12. A door and door jamb arrangement, for securing the opening of a secure space, the door and door jamb arrangement including:

a door jamb;

a door adapted to be hingedly attached to the door jamb with a hinge arrangement, the door having a hinged edge or end, and non-hinged edges or ends including a top, a bottom and a remote edge; and an opening having a planar space defined by the door jamb and adapted to be closed by the door in a closed position, wherein:

the hinge arrangement comprises (a) a first hinge affixed to the door jamb and having a first hinge axis, and (b) a second hinge affixed to the door and having a second hinge axis;

and wherein the hinge arrangement is adapted, when the door is near or adjacent the closed position:

(i) to move the door and the second hinge axis laterally relative to the door jamb;

(ii) to move at least a door portion of two adjacent edges of the door relative to corresponding and adjacent jamb portions of an edge of the door jamb between overlapping and non-overlapping positions; and wherein the door and door arrangement further comprises a locking mechanism which is adapted to move the door vertically relative to the door jamb.

13. The door and door jamb arrangement of claim 12, wherein the locking arrangement is adapted to move the door and the second hinge axis laterally relative to the door jamb and the first axis simultaneously when the door moves vertically relative to the door jamb.

14. The door and door jamb arrangement as claimed in claim 12, further comprising a lever mechanism which spans between the locking mechanism and the hinge arrangement.

15. The door and door jamb arrangement as claimed in claim 14, wherein the lever mechanism is adapted to lift the door relative to the hinge arrangement and the door jamb as the locking mechanism is actuated.

16. The door and door jamb arrangement as claimed in claim 14, wherein the lever mechanism includes a pivot connection with the door.

17. The door and door jamb arrangement as claimed in claim 14, wherein the lever mechanism includes a spring attached between different components of the lever or between the lever and the door, the spring adapted to assist in lifting the door relative to the hinge arrangement and the door jamb.

18. The door and door jamb arrangement as claimed in claim 12, wherein the door further includes a guard located at a base of the door, the guard adapted to maintain a vertical position as the door moves relative to the hinge arrangement and the door jamb.

19. The door and door jamb arrangement as claimed in claim 18, wherein the guard is attached to the hinge arrangement.

20. The door and door jamb arrangement as claimed in claim 12, wherein the door includes a guard support which is adapted to engage with a jamb guard upon movement of the door relative to the hinge arrangement and the door jamb.

* * * * *